United States Patent
Chang et al.

(10) Patent No.: US 7,320,126 B2
(45) Date of Patent: Jan. 15, 2008

(54) IMPLEMENTATION OF IN SYSTEM PROGRAMMING TO UPDATE FIRMWARE ON MEMORY CARDS

(75) Inventors: Robert C. Chang, Danville, CA (US); Ping Li, Santa Clara, CA (US); Farshid Sabet-Sharghi, San Jose, CA (US)

(73) Assignee: SanDisk Corporation, Milpitas, CA (US)

( * ) Notice: Subject to any disclaimer, the term of this patent is extended or adjusted under 35 U.S.C. 154(b) by 1157 days.

(21) Appl. No.: 10/005,740

(22) Filed: Nov. 6, 2001

(65) Prior Publication Data

US 2003/0088868 A1   May 8, 2003

(51) Int. Cl.
*G06F 9/44* (2006.01)
(52) U.S. Cl. ............................ 717/168; 717/171; 710/5
(58) Field of Classification Search .............. 717/168, 717/171; 710/5
See application file for complete search history.

(56) References Cited

U.S. PATENT DOCUMENTS

| | | | |
|---|---|---|---|
| 6,148,366 A * | 11/2000 | Watanabe | 710/57 |
| 6,199,194 B1 | 3/2001 | Wang et al. | 717/1 |
| 6,253,281 B1 | 6/2001 | Hall | 711/112 |
| 6,266,809 B1 | 7/2001 | Craig et al. | 717/11 |
| 6,393,561 B1 * | 5/2002 | Hagiwara et al. | 713/100 |
| 6,402,028 B1 | 6/2002 | Graham, Jr. et al. | |
| 2002/0137501 A1 * | 9/2002 | Datar et al. | 455/419 |
| 2002/0194403 A1 * | 12/2002 | Pua et al. | 710/62 |

FOREIGN PATENT DOCUMENTS

| | | |
|---|---|---|
| DE | 20109810 U1 | 6/2001 |
| EP | 1003099 A2 | 5/2000 |
| EP | 1058450 A1 | 12/2000 |
| WO | WO 00/67132 | 11/2000 |
| WO | WO 01/78020 | 10/2001 |
| WO | WO 01/78020 A1 * | 10/2001 |

OTHER PUBLICATIONS

"Smart Card Devices and Applications" Jan. 2001, http://www.netcaucus.org/books/egov20, p. 6, lines 2-7, paragraph 6.
ISO/IEC 7816 Part 4: Interindustry Command for Interchange, http://www.ttfn.net/techno/smartcards, pp. 1-36.
"The MultiMediaCard", System Specification, Version 2.2, MMCA Technical Committee, Jan. 2000.
"Part I, Physical Layer Specification Version 0.92", SD Memory Card Specifications, SD Group, Dec. 1999.

* cited by examiner

*Primary Examiner*—Meng-Al T. An
*Assistant Examiner*—William H. Wood
(74) *Attorney, Agent, or Firm*—Anderson, Levine & Lintel

(57) ABSTRACT

Methods and apparatus for efficiently enabling firmware associated with a flash memory card to be updated are disclosed. According to one aspect of the present invention, a method for updating firmware associated with a memory storage device includes providing new firmware to a host and sending the new firmware from the host to a reader which communicates with the host. The reader interfaces with the memory storage device which includes installed firmware. The method also includes sending the new firmware from the reader to the memory storage device, and incorporating the new firmware into the memory storage device such that the new firmware at least partially replaces the installed firmware. In one embodiment, the method further includes embedding the new firmware into a first command. In such an embodiment, sending the new firmware from the host to the reader includes sending the first command from the host to the reader.

3 Claims, 11 Drawing Sheets

| Byte \ Bit | 7 | 6 | 5 | 4 | 3 | 2 | 1 | 0 |
|---|---|---|---|---|---|---|---|---|
| 0 | Operation Code (D0h) ||||||||
| 1 | Reserved ||||||||
| 2 | Reserved ||||||||
| 3 | Reserved ||||||||
| 4 | Reserved ||||||||
| 5 | Reserved ||||||||
| 6 | Reserved ||||||||
| 7 | Reserved ||||||||
| 8 | Reserved ||||||||
| 9 | Reserved ||||||||
| 10 | Lock | Reserved |||||| ISP ENB | PASS ENB |
| 11 | ||||||||

*FIG. 6A*

| Byte \ Bit | 7 | 6 | 5 | 4 | 3 | 2 | 1 | 0 |
|---|---|---|---|---|---|---|---|---|
| 0 | Reserved || Media Card Type ||| ISP ENB | PASS ENB |
| 1 | RCA Bits 31-24 ||||||||
| 2 | RCA Bits 23-16 ||||||||

*FIG. 6B*

| Byte \ Bit | 7 | 6 | 5 | 4 | 3 | 2 | 1 | 0 |
|---|---|---|---|---|---|---|---|---|
| 0 | \multicolumn{8}{c}{Operation Code (D1h)} ||||||||
| 1 | Reserved |||||||||
| 2 | Command Index |||||||||
| 3 | Command Argument 1 |||||||||
| 4 | Command Argument 2 |||||||||
| 5 | Command Argument 3 |||||||||
| 6 | Command Argument 4 |||||||||
| 7 | Data Transfer Length (MLSB) |||||||||
| 8 | Data Transfer Length (LMSB) |||||||||
| 9 | Data Transfer Length (LLSB) |||||||||
| 10 | Response Type | | | | DIR | APP | RESP | Reserved |
| 11 | Control |||||||||

*FIG. 6C*

| Byte \ Bit | 7 | 6 | 5 | 4 | 3 | 2 | 1 | 0 |
|---|---|---|---|---|---|---|---|---|
| 0 | \multicolumn{8}{c}{Operation Code (D2h)} ||||||||
| 1 | Reserved ||||||||
| 2 | 'S' ||||||||
| 3 | 'D' ||||||||
| 4 | Reserved (Error Register) ||||||||
| 5 | Sector Count Register/Feature Register ||||||||
| 6 | Sector Register ||||||||
| 7 | Cylinder Low Register ||||||||
| 8 | Cylinder High Register ||||||||
| 9 | Device/Head Register ||||||||
| 10 | Command/Status Register ||||||||
| 11 | Reserved | | | | | DATA | DIR | REGS |

*FIG. 7A*

| Byte \ Bit | 7 | 6 | 5 | 4 | 3 | 2 | 1 | 0 |
|---|---|---|---|---|---|---|---|---|
| 0 | 'S' ||||||||
| 1 | 'D' ||||||||
| 2 | Reserved (Error Register) ||||||||
| 3 | Sector Count Register/Feature Register ||||||||
| 4 | Sector Register ||||||||
| 5 | Cylinder Low Register ||||||||
| 6 | Cylinder High Register ||||||||
| 7 | Device/Head Register ||||||||
| 8 | Command/Status Register ||||||||

*FIG. 7B*

|  | Register | 7 | 6 | 5 | 4 | 3 | 2 | 1 | 0 |
|---|---|---|---|---|---|---|---|---|---|
| 812a | Feature | na |  |  |  |  |  |  | ENB |
| 812b | Sector Count | na |  |  |  |  |  |  |  |
| 812c | Sector Count | na |  |  |  |  |  |  |  |
| 812d | Cylinder Low | na |  |  |  |  |  |  |  |
| 812e | Cylinder High | na |  |  |  |  |  |  |  |
| 812f | Device/Head | obs | na | Obs | DEV | na |  |  |  |
| 812g | Command | D5h |  |  |  |  |  |  |  |

Columns: 808h, 808g, 808f, 808e, 808d, 808c, 808b, 808a

*FIG. 8A*  ↳ 804

|  | Register | 7 | 6 | 5 | 4 | 3 | 2 | 1 | 0 |
|---|---|---|---|---|---|---|---|---|---|
| 812a | Error | 0h |  |  |  |  |  |  |  |
| 812b | Sector Count | 55h |  |  |  |  |  |  |  |
| 812c | Sector Count | AAh |  |  |  |  |  |  |  |
| 812d | Cylinder Low | 0h |  |  |  |  |  |  |  |
| 812e | Cylinder High | 0h |  |  |  |  |  |  |  |
| 812f | Device/Head | obs | na | Obs | DEV | WP | Media Type |  |  |
| 812g | Status | BSY | DRDY | DF | 1 | DRQ | 0 | 0 | ERR |

Columns: 818h, 818g, 818f, 818e, 818d, 818c, 818b, 818a

|  | Register | 7 | 6 | 5 | 4 | 3 | 2 | 1 | 0 |
|---|---|---|---|---|---|---|---|---|---|
| 832a | Error | 0 | 0 | 0 | 0 | 0 | 0 | ABRT | 0 |
| 832b | Sector Count | na ||||||||
| 832c | Sector Count | na ||||||||
| 832d | Cylinder Low | na ||||||||
| 832e | Cylinder High | na ||||||||
| 832f | Device/Head | obs | na | Obs | DEV | na ||||
| 832g | Status | BSY | DRDY | DF | na | DRQ | na | na | ERR |

*FIG. 8C*

|  | Register | 7 | 6 | 5 | 4 | 3 | 2 | 1 | 0 |
|---|---|---|---|---|---|---|---|---|---|
| 852a | Feature | 0h ||||||| DIR |
| 852b | Sector Count | Number of sectors ||||||||
| 852c | Sector Count | Starting LBA of Firmware (LSB) ||||||||
| 852d | Cylinder Low | Starting LBA of Firmware (Middle Byte) ||||||||
| 852e | Cylinder High | Starting LBA of firmware (MSB) ||||||||
| 852f | Device/Head | obs | na | Obs | DEV | 0h |||
| 852g | Command | D6h ||||||||

*FIG. 8D*

ABSTRACT
IMPLEMENTATION OF IN SYSTEM PROGRAMMING TO UPDATE FIRMWARE ON MEMORY CARDS

BACKGROUND OF THE INVENTION

1. Field of Invention

The present invention relates generally to mass digital data storage systems. More particularly, the present invention relates to systems and methods for enabling a user to update the firmware associated with a mass digital data storage system such as a memory card.

2. Description of the Related Art

The use of non-volatile memory systems such as flash memory storage systems is increasing due to the compact physical size of such memory systems, and the ability for non-volatile memory to be repetitively reprogrammed. The compact physical size of flash memory storage systems facilitates the use of such storage systems in devices which are becoming increasingly prevalent. Devices which use flash memory storage systems include, but are not limited to, digital cameras, digital camcorders, digital music players, handheld personal computers, and global positioning devices. The ability to repetitively reprogram non-volatile memory included in flash memory storage systems enables flash memory storage systems to be used and reused.

When firmware which allows instructions to run on a flash memory system such as a memory card needs to be updated, a user generally sends the card back the manufacturer of the memory card. The manufacturer may update the firmware on the memory card, e.g., a COMPACT FLASH (CF) card or a Secure Digital (SD) card, to provide new features for the card, or to fix bugs in the firmware. Typically, the manufacturer may use specialized hardware to update the firmware. As will be appreciated by those skilled in the art, processes used to update firmware in memory cards are generally complicated, and subject to error. Therefore, updating the firmware in a memory card is often a time-consuming, difficult process for the manufacturer of the memory card.

In addition to being time-consuming and difficult for a manufacturer, updating the firmware in a memory card is often an inconvenient process to a user. Sending or otherwise providing the memory card to a manufacturer for updating, and awaiting the return of the updated memory card may be inconvenient, particularly when the memory card is not available for use by the user for an extended period of time.

Therefore, what is desired is a system which enables firmware on a memory card to be updated efficiently. Specifically, what is needed is a system and a method which allows the firmware on a memory card to be updated efficiently and relatively easily by a user, without requiring that the memory card be returned to a manufacturer.

SUMMARY OF THE INVENTION

The present invention relates to a system and a method for efficiently enabling firmware associated with a flash memory card to be updated. According to one aspect of the present invention, a method for updating firmware associated with a memory storage device includes providing new firmware to a host and sending the new firmware from the host to a reader which is in communication with the host. The reader interfaces with the memory storage device which includes installed firmware. The method also includes sending the new firmware from the reader to the memory storage device, and incorporating the new firmware into the memory storage device such that the new firmware at least partially replaces the installed firmware. In one embodiment, the method further includes embedding the new firmware into a first command. In such an embodiment, sending the new firmware from the host to the reader includes sending the first command from the host to the reader.

In another embodiment, incorporating the new firmware into the memory storage device updates the installed firmware by writing the new firmware into the memory storage device using the host. In such an embodiment, the method may also include enabling in-system-programming capabilities on the reader that allow the new firmware to be incorporated into the memory storage device.

Allowing the firmware on a memory storage device such as a flash memory card to be substantially updated by a user through the use of a host and a reader allows the updating to be performed efficiently. A reader and a flash memory card that are each arranged to support in system programming enable card firmware updates to be performed without requiring a relatively large investment of time. By providing updates to a user through a software package, and allowing the software package to cooperate with the card reader to provide the update to the memory card, the process of upgrading the memory card is also relatively uncomplicated.

According to another aspect of the present invention, a system for updating firmware associated with a memory card includes, in addition to the memory card on which card firmware is installed, means for providing new card firmware to the memory card and means for incorporating the new card firmware into the memory card such that the new card firmware at least partially replaces the installed card firmware. In one embodiment, the means for providing the new card firmware to the memory card includes a host and means for allowing the host to interface with the memory card. The host provides the new card firmware to the means for allowing the host to interface with the memory card, and the means for allowing the host to interface with the memory card includes means for sending the new card firmware to the memory card.

In accordance with another aspect of the present invention, a memory storage device that interfaces with a reader includes a storage element that stores data and firmware. The firmware cooperates with the storage element to store the data and to execute instructions. The firmware also supports in-system-programming capabilities which enable the firmware to be substantially updated while the memory storage device is interfaced with the reader. In one embodiment, the memory storage device also includes a receiving mechanism that receives an update for the firmware through the reader. In such an embodiment, the firmware incorporates the update to update the firmware.

According to another aspect of the present invention, an adapter that enables a memory device to communicate with a computing system includes a port and firmware. The port is arranged to accept the memory device substantially into the adapter, and the firmware supports in-system-programming capabilities. The in-system-programming capabilities include enabling the computing system to provide the memory device with updated firmware code for the memory device through the adapter. In one embodiment, the adapter is one of a USB reader or a PC reader.

These and other advantages of the present invention will become apparent upon reading the following detailed descriptions and studying the various figures of the drawings.

BRIEF DESCRIPTION OF THE DRAWINGS

The invention may best be understood by reference to the following description taken in conjunction with the accompanying drawings in which:

FIG. 6a is a diagrammatic representation of a command descriptor block associated with a Check ISP command that is suitable for use in a system with a secure digital memory card in accordance with an embodiment of the present invention.

FIG. 6b is a diagrammatic representation of a data block that is suitable for use in returning data from a reader to a host in response to a Check ISP command in accordance with an embodiment of the present invention.

FIG. 6c is a diagrammatic representation of a command descriptor block associated with a Media Card Execute SD command that is suitable for use in a system with a secure digital memory card in accordance with an embodiment of the present invention.

FIG. 7a is a diagrammatic representation of a command descriptor block associated with a Media Card Execute CF command which is suitable for use in a system with a COMPACT FLASH memory card in accordance with an embodiment of the present invention.

FIG. 7b is a diagrammatic representation of a block which may be returned to a COMPACT FLASH memory card in response to a Media Card Execute CF command in accordance with an embodiment of the present invention.

FIG. 8a is a diagrammatic representation of a command block register data associated with a Check ISP command that is suitable for use with a COMPACT FLASH card in accordance with an embodiment of the present invention.

FIG. 8b is a diagrammatic representation of a command block register data which may be returned by a COMPACT FLASH card to a reader in accordance with an embodiment of the present invention.

FIG. 8c is a diagrammatic representation of a command block register data that may be sent from a COMPACT FLASH card to a reader when an error has been encountered in processing a Check ISP command in accordance with an embodiment of the present invention.

FIG. 8d is a diagrammatic representation of a command block register data that may be sent to a reader from a COMPACT FLASH card as part of a Media Card Execute CF ISP command in accordance with an embodiment of the present invention.

DETAILED DESCRIPTION OF THE EMBODIMENTS

Conventional processes for updating or upgrading firmware on a flash memory card are often inconvenient for an owner or user, time-consuming, and difficult. As a manufacturer generally updates the firmware on a memory card that is owned by a user, the need for the user to provide the memory card to the manufacturer is often inconvenient, as the memory card may not be used by the user while the memory card is in the possession of the manufacturer. Processes used by a manufacturer to update the firmware on a memory card are often complicated and, hence, are both time-consuming and subject to errors.

Enabling the firmware on a flash memory card to be substantially updated by a user, as for example using a computer and a card reader that are accessible to the user, allows the updating to be performed efficiently and, typically, relatively conveniently. By providing updates to a user through a software package, and allowing the software package to cooperate with the card reader to provide the update to the memory card, the process of upgrading the memory card is also relatively uncomplicated.

Figure 1:
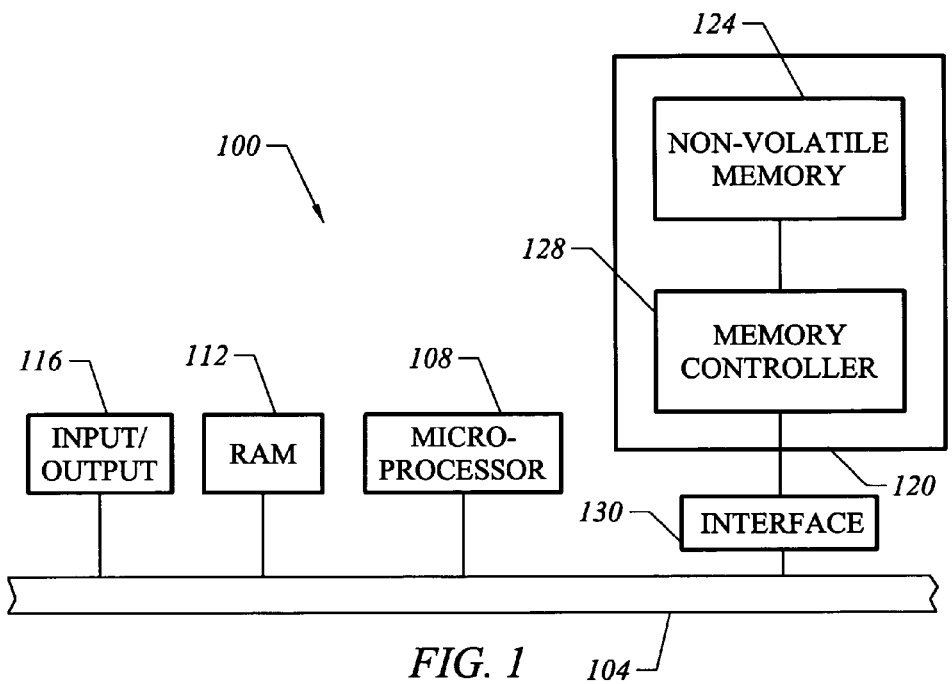
FIG. 1 is a diagrammatic representation of a general host system which includes a non-volatile memory device in accordance with an embodiment of the present invention.

A memory card which is suitable for use in an overall system which allows the firmware associated with the memory card to be updated is generally used in conjunction with a host system. Referring initially to FIG. 1, a general host system that includes a non-volatile memory device, e.g., a COMPACT FLASH memory card or a Secure Digital (SD) card, will be described. A host or computer system 100 generally includes a system bus 103 which allows a microprocessor 108, a random access memory (RAM) 112, and input/output circuits 116 to communicate. It should be appreciated that host system 100 may generally include other components, e.g., display devices and networking devices, which are not shown for purposes of illustration.

In general, host system 100 may be capable of capturing information including, but not limited to, still image information, audio information, and video image information. Such information may be captured in real-time, and may be transmitted to host system 100 in a wireless manner. While host system 100 may be substantially any system, host system 100 is typically a system such as a digital camera, a video camera, a cellular communications device, an audio player, or a video player. It should be appreciated, however, that host system 100 may generally be substantially any system which stores data or information, and retrieves data or information.

Host system 100 may also be a system which either only captures data, or only retrieves data. That is, host system 100 may be a dedicated system which stores data, or host system 100 may be a dedicated system which reads data. By way of example, host system 100 may be a memory writer which is arranged only to write or store data. Alternatively, host system 100 may be a device such as an MP3 player which is typically arranged to read or retrieve data, and not to capture data.

A non-volatile memory device 120 which, in one embodiment, is a removable non-volatile memory device, is arranged to interface with bus 104 to store information. Typically, non-volatile memory device 120 communicates with bus 104 through an interface 130. Interface 130 may serve to reduce loading on bus 104, as will be understood by those skilled in the art. In one embodiment, interface 130 may be a reader or an adaptor.

Non-volatile memory device 120 includes non-volatile memory 124 and a memory control system 128. In one embodiment, non-volatile memory device 120 may be implemented on a single chip or a die. Alternatively, non-volatile memory device 120 may be implemented on a multi-chip module, or on multiple discrete components which may be used together as non-volatile memory device 120.

Non-volatile memory 124, or core, is arranged to store data such that data may be accessed and read as needed. Data stored in non-volatile memory 124 may also be erased as appropriate, although it should be understood that some data in non-volatile memory 124 may not be erased. The processes of storing data, reading data, and erasing data are generally controlled by memory control system 128. In one embodiment, memory control system 128 manages the operation of non-volatile memory 124 such that the lifetime of non-volatile memory 124 is substantially maximized by essentially causing sections of non-volatile memory 124 to be worn out substantially equally.

While non-volatile memory device 120 has generally been described as including a memory control system 128, i.e., a memory controller, it should be understood that not all non-volatile memory devices include a controller. By way of example, while non-volatile memory devices including, but not limited, PC cards, COMPACT FLASH cards, MULTIMEDIA cards, and Secure Digital cards include controllers, other non-volatile memory devices including, but not limited to, SMART MEDIA cards and MEMORY STICK cards may not include controllers. In an embodiment in which non-volatile memory device 124 does not include a controller, the functions associated with the controller may be integrated into a single chip, as will be appreciated by those skilled in the art. It should be understood that non-volatile memory device 120 may generally be implemented as either a single-chip device or a multi-chip module, as previously mentioned.

Figure 2:
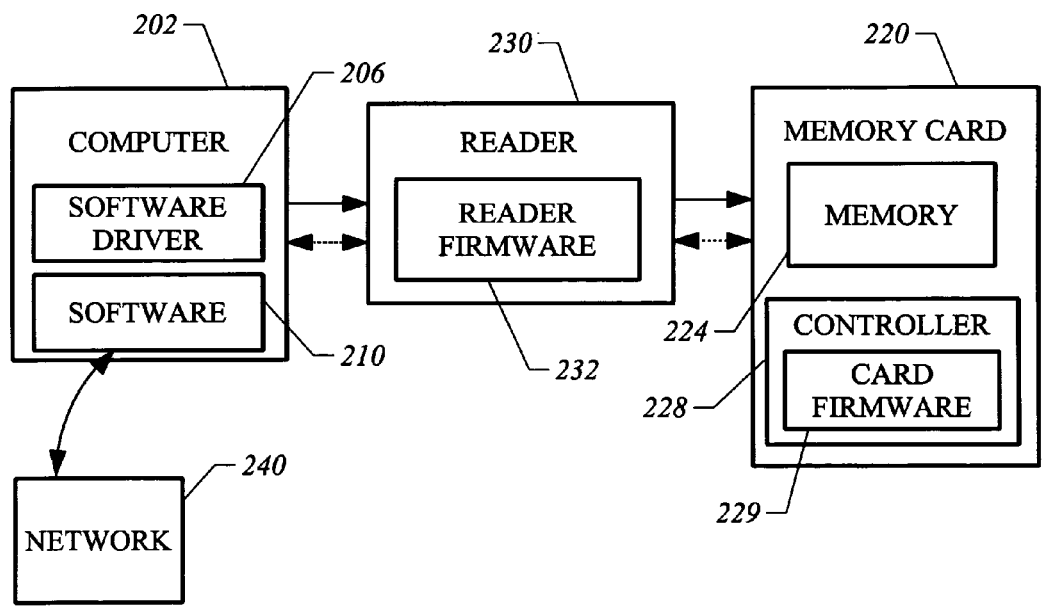
FIG. 2 is a diagrammatic representation of a computer system, a reader, and a memory card which are part of a system in which the card firmware associated with the memory card may be updated in accordance with an embodiment of the present invention.

In one embodiment, host system 100 may be a computer system which stores information to or reads information from a non-volatile memory device such as a memory card through a card reader interface. That is, host system 100 may be a computer system which makes use of a memory card to store data and to read data. FIG. 2 is a diagrammatic representation of a computer system, reader, and memory card which cooperate to update firmware associated with the memory card in accordance with an embodiment of the present invention. A computer system 202 generally communicates with a memory card 220 through a reader 230. Reader 230 typically serves as an interface between computer system 202 and memory card 220 to enable computer system 202 to store data in a memory 224 of memory card 220 and to retrieve data from memory 224. That is, when computer system 202 communicates with memory card 220 to transfer data between computer system 202 and memory card 220, the communications take place through reader 230. Reader 230 may include a port or a receptacle (not shown) which enables memory card 220 to communicably interface with reader 230 such that reader 230 may enable communications to be made between memory card 220 and computer system 202.

Memory card 220 includes both memory 224 and a controller 228. Memory 224 may include storage elements, blocks, or cells which store bits of information. Controller 228 interfaces with memory 224 to facilitate the storage of and retrieval of data from memory 224. Controller 228 includes card firmware 229 which facilitates the operation of controller 228 by effectively allowing instructions to be executed or run using controller 228. For an embodiment in which card firmware 229 may be updated using computer system 202 and reader 230, card firmware 229 also includes in-system-programming (ISP) support capabilities. ISP support capabilities generally provide functionality which enables card firmware 229 to be updated substantially by a user, without requiring that memory card 220 be returned to a manufacturer in order for card firmware 229 to be updated.

Reader 230, which, for example, may be a Universal Serial Bus (USB) reader or a personal computer (PC) card reader, includes reader firmware 232 which allows reader 230 to run instructions associated with the operation of reader 230. Like card firmware 229, reader firmware 232 includes ISP support capabilities. That is, reader firmware 232 is arranged to support the updating or upgrading of card firmware 229.

When it is determined that card firmware 229 is in need of updating or upgrading, e.g., through a notification from the manufacturer of memory card 220, software 210 which includes the new or updated card firmware may be obtained from a network 240 by computer system 202. By way of example, computer system 202 may communicate with a website on network 240 that is associated with the manufacturer of memory card 220 to download software 210 and, in one embodiment, a software driver 206. It should be appreciated that in lieu of obtaining software 210 through network 240, software 210 may also be obtained using a media storage device such as a CD-ROM or a floppy disk.

Information included in software 210 may be used by computer system 202 in cooperation with reader 230 to update card firmware 229. For example, new or updated card firmware which is included in software 210 may be substantially extracted from software 210 by computer system 202, and provided to memory card 220 using reader 230. Providing the updated card firmware to memory card 220 generally involves providing the updated card firmware as an input to memory card 220, e.g., as an input to an input/output port or receiving mechanism (not shown) of memory card 220. Memory card 220 may successful incorporate the updated card firmware when both reader 230 and memory card include ISP support capabilities.

When firmware is downloaded, a small block of ISP codes may be allocated to handle ISP. It should be appreciated that once a download of updated firmware begins, card firmware 229 typically completes substantially all of its internal activities. In addition, once a download of updated card firmware has commenced, card firmware 229 may not handle any commands with the exception of commands associated with the reading of updated card firmware content and commands associated with the downloading process. Once the download has completed, memory card 220 may perform a reset procedure using the newly installed firmware.

Figure 3:
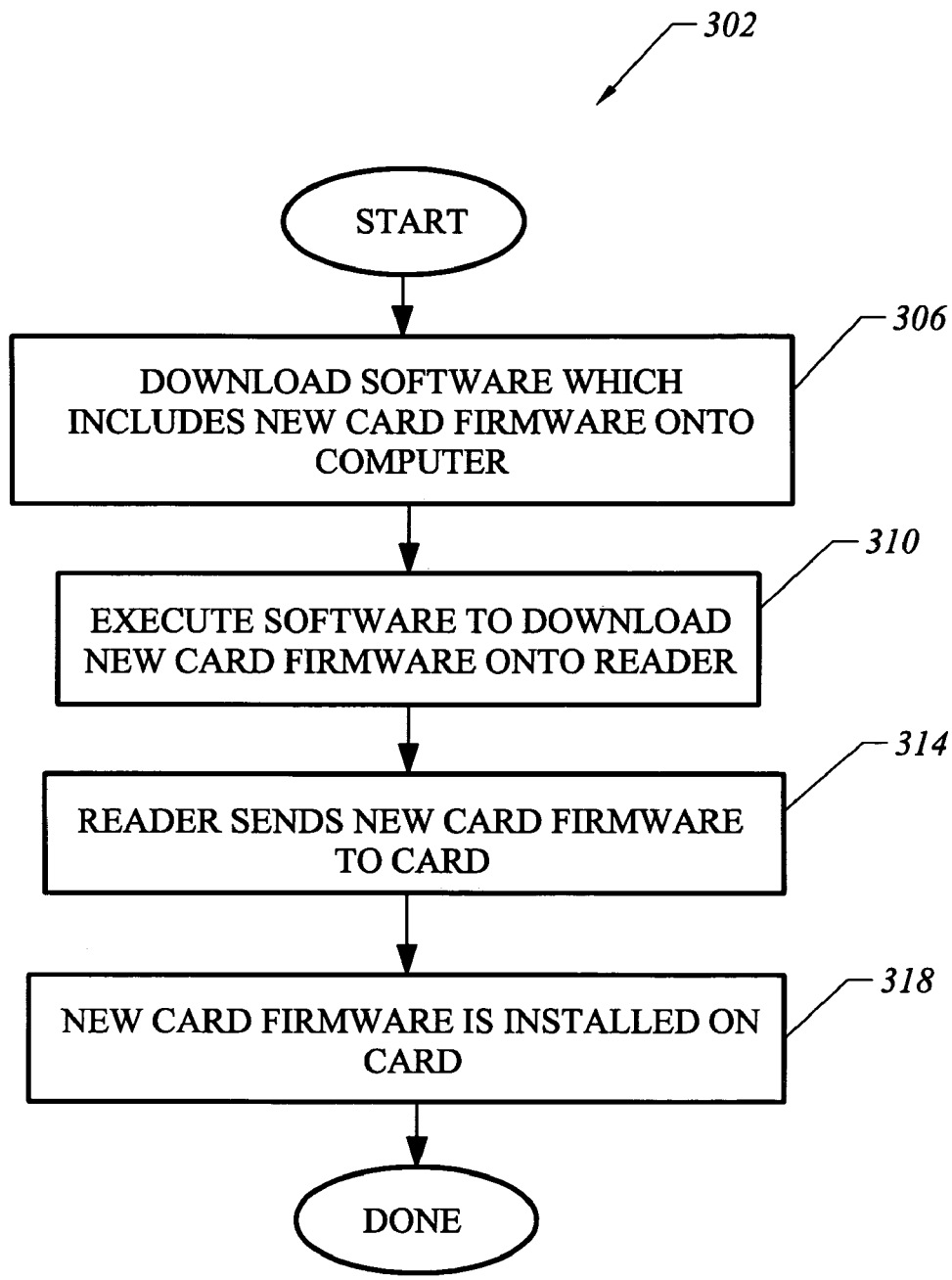
FIG. 3 is a process flow diagram which illustrates the steps associated with a process of updating card firmware on a card in accordance with an embodiment of the present invention.

With reference to FIG. 3, the general steps associated with updating card firmware on a memory card will be described in accordance with an embodiment of the present invention. A process 302 of updating card firmware begins at step 306 in which software which includes new card firmware which is to essentially replace the card firmware that is currently on the memory card is downloaded onto a computer, i.e., the computer which is in communication with the memory card. As described above with respect to FIG. 2, the software which includes the new card firmware may be downloaded onto the computer from a network.

Once the software is downloaded, the software is executed in step 310 to download the new card firmware onto the reader which serves as an interface between the computer and the memory card. In one embodiment, executing the software includes substantially extracting the new card firmware from the software such that the new card firmware may be sent or downloaded to the reader. After the new card firmware is downloaded onto the reader, process flow moves to step 314 in which the reader sends or downloads the new card firmware to the memory card. Upon receiving or otherwise obtaining the new card firmware, the new card firmware is installed on the memory card in step 318. Typically, the new card firmware either replaces or augments the card firmware which was already on the memory card. The process of updating card firmware is completed once the new card firmware is installed on the memory card.

In general, specific processes for updating card firmware may vary depending upon the type of memory card that is being updated. By way of example, a process for updating the card firmware of an SD memory card may vary from a process for updating the card firmware on a CF memory card. One suitable process for updating the card firmware of an SD memory card will be described with respect to FIGS. 4a and 4b, while one suitable process for updating the card firmware of a CF memory card will be described below with reference to FIG. 5.

Figure 4A:
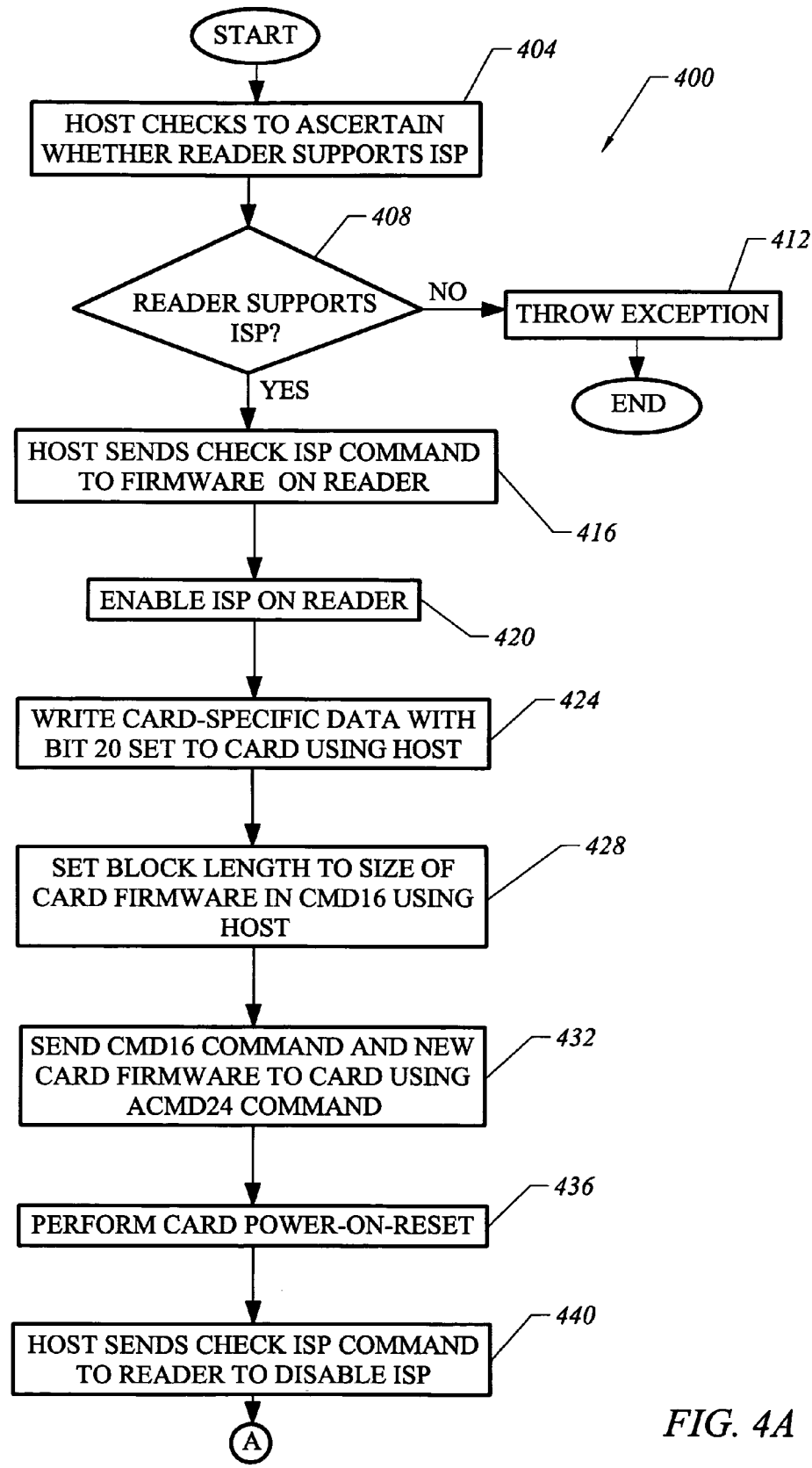
FIGS. 4a and 4b are a process flow diagram which illustrates the steps associated with updating firmware on a secure digital memory card in accordance with an embodiment of the present invention.
Figure 4B:
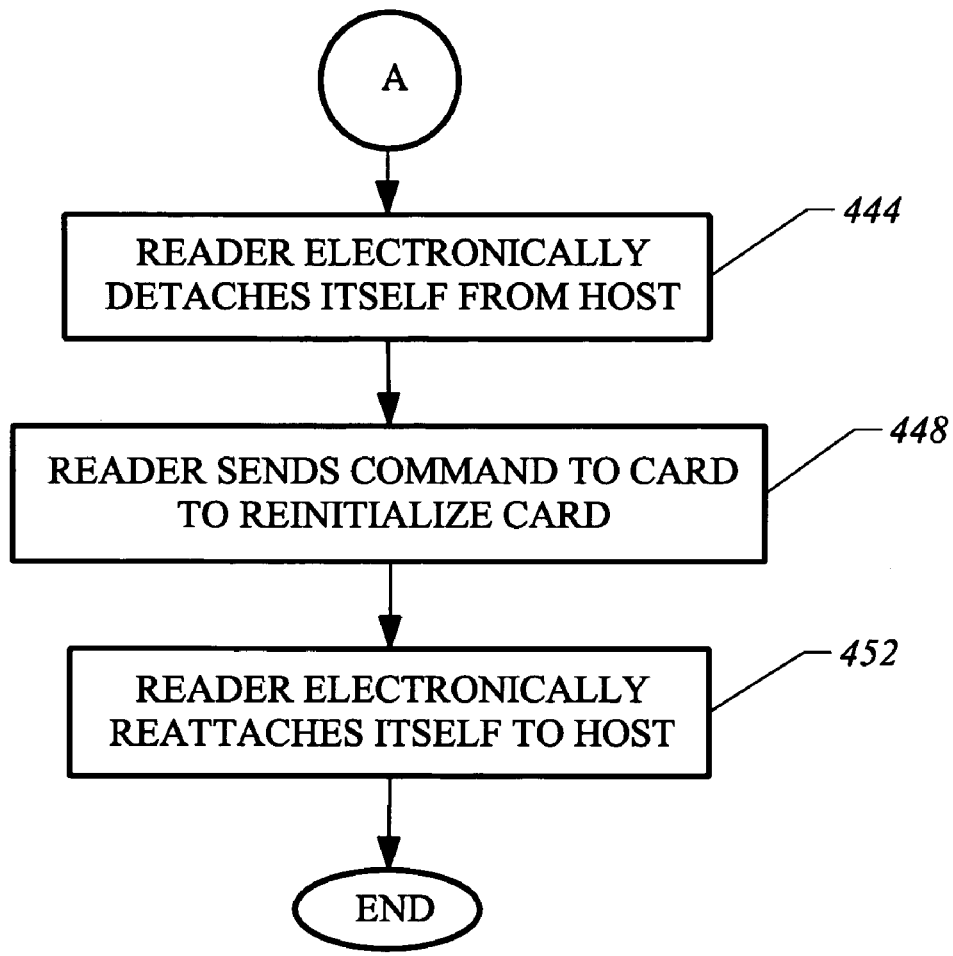

FIGS. 4a and 4b are a process flow diagram which illustrates the steps associated with updating the firmware on an SD card in accordance with an embodiment of the present invention. A process 400 of updating the firmware on an SD card begins at step 404 in which a host computer determines whether the reader which allows the host computer to interface with the SD card supports ISP. In the described embodiment, such a determination may be made by checking if the small computer system interface (SCSI) Inquiry data information for ISP support is available on the reader. As will be appreciated by those skilled in the art, SCSI is a parallel interface standard used by a USB system for attaching peripheral devices such as card readers to computers. The determination of whether the SD card supports ISP may include determining if a particular bit in card specific data information is set, e.g., whether the nineteenth bit in the card specific data information is set to '1.'

It should be appreciated that the steps associated with updating the firmware on an SD card may also be applied to updating the firmware on a MULTIMEDIA card (MMC). As such, steps associated with process 400, though described in terms of an SD card, are generally also applicable to an MMC card.

A determination is made in step 408 regarding whether the reader supports ISP. If it is determined that the reader does not support ISP, then the indication is that the reader may not be used to facilitate the updating of firmware on the SD card. As such, process flow moves to step 412 in which an exception is thrown to indicate that the reader does not support ISP. Once the exception is thrown, the process of updating the firmware on the SD card is effectively terminated.

Alternatively, if it is determined in step 408 that the reader does support ISP, then in step 416, the host sends a command, e.g., a SCSI Check ISP command, to firmware on the reader to enable ISP support. One embodiment of a Check ISP command will be described below with respect to FIG. 6a. After the Check ISP command is sent, ISP support is enabled on the reader in step 420. Enabling ISP support may include, in one embodiment, setting the twentieth bit in the card specific data information to '1' in response to the Check ISP command. In response to a command to enable ISP support, the reader may return a data structure to the host which substantially identifies the relative card address (RCA) of the SD card, as will be discussed below with reference to FIG. 6b.

Once ISP support is enabled on the reader, ISP support is enabled on the SD or MMC card in step 424. In one embodiment, enabling ISP support on the SD or MMC card may include writing card-specific data with the twentieth bit set, i.e., to indicate that ISP is supported, to the SD or MMC card using the host. The CMD9 command to retrieve and the CMD27 command to program the card-specific data may be substantially embedded within a SCSI Media Card Execute SD command, as will be discussed below with respect to FIG. 6c.

After the card-specific data is written to the SD card, or an MMC card, the block length associated with a CMD16 command is set in step 428 to the size of the card firmware that is to be transferred from the host to the SD card, or to the MMC card. As will be understood by those skilled in the art, the CMD16 command is a standard command that is recognized by both SD and MMC cards. The CMD16 command is described in the "MultiMedia Card System Specification, Version 2.2," published by the MMCA Technical Committee in January 2000, which is incorporated herein by reference in its entirety. The CM16 command may be embedded within a Media Card Execute SD command.

In step 432, the CMD16 command and the new card firmware are sent to the SD card from the host through the reader using a command such as an ACMD24 command, which may be embedded within a Media Card Execute SD command. In general, ACMD24 command is a command which enables the new card firmware to be written to the SD card. As such, once the ACMD24 command is received by the SD card, the SD card may substantially install the new card firmware.

Once the new card firmware is installed on the SD card, the card performs a power-on-reset in step 436. That is, the SD card effectively reboots itself to enable initialization codes associated with the SD card to execute to substantially initialize the updated card firmware, i.e., the card firmware that includes the new card firmware. In one embodiment, the power-on-reset, which is performed by the card firmware, essentially includes powering down the SD card and then powering the SD card back up. After the power-on-reset is performed, the host sends a Check ISP command to the reader in step 440 the reader to disable ISP support. The ISP support may be disabled by sending the Check ISP command with an appropriate bit set to '0.'

Upon receiving the command to disable ISP support, the reader typically electronically detaches itself from the host in step 444. While electronically detaching the reader from the host may include the reader detaching itself from the USB bus of the host, electronically detaching the reader from the host may also include physically detaching the reader from the host. Once the reader is electronically detached from the host, the reader sends a command to the SD card in step 448 to reinitialize the SD card.

A CMD0 command may reset the SD card, while a CMD1 command may activate the initialization process of the MMC card and a ACMD41 may activate the SD card.

After the SD card is reinitialized, the reader electronically reattaches itself to the host in step 452. By electronically reattaching itself to the host in step 452, the reader effectively causes the host or, more specifically, software associated with the host to interact with the SD card as a new device. In other words, the electronic detachment of the reader in step 444 and the electronic reattachment of the reader in step 452 essentially cause the host to view the SD card as a new device and, hence, enables the updated firmware on the SD card to be recognized by the host. Once the reader electronically reattaches itself to the host, the process of updating card firmware on an SD card is completed.

Figure 5:
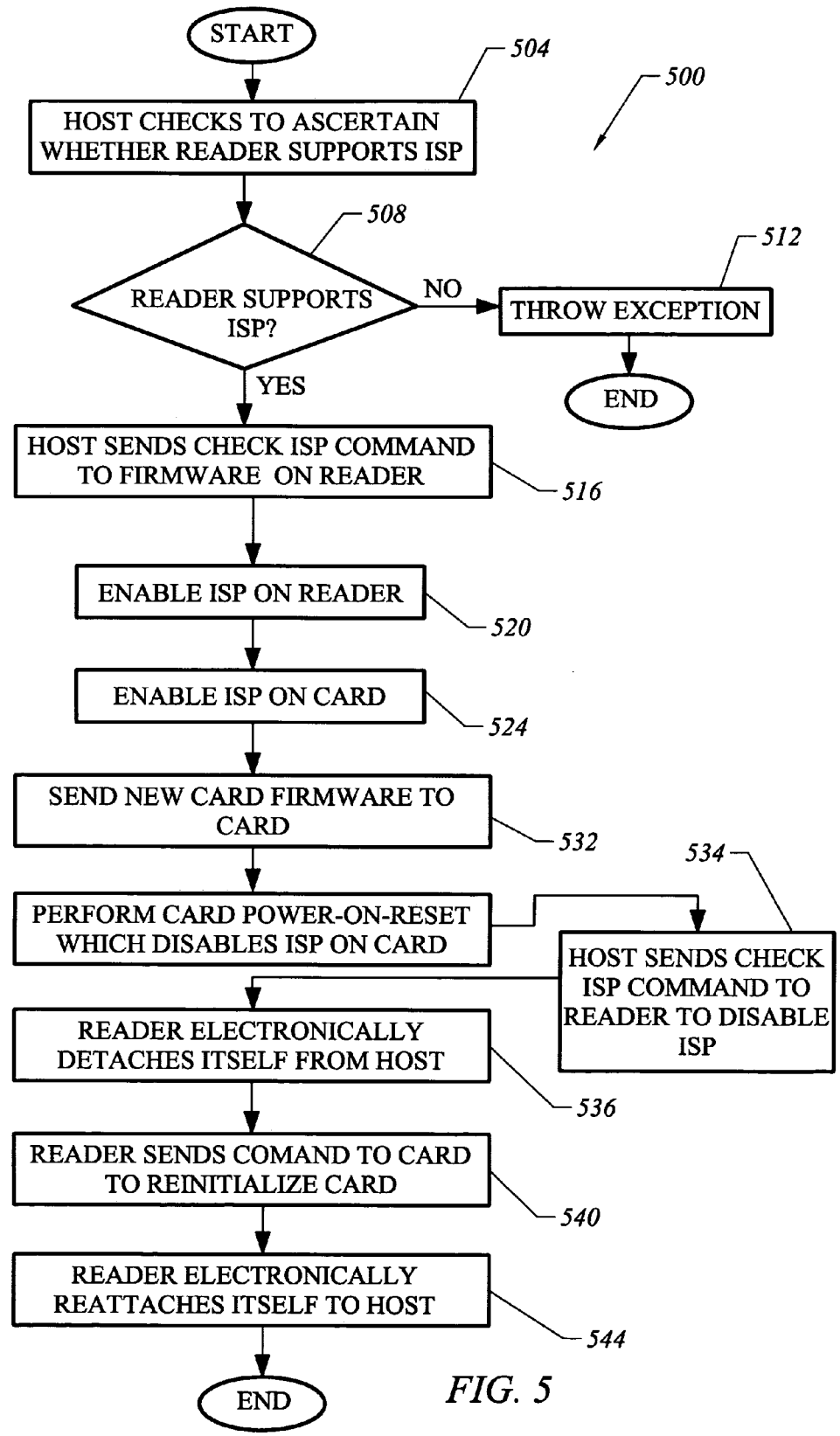
FIG. 5 is a process flow diagram which illustrates the steps associated with updating firmware on a COMPACT FLASH memory card in accordance with an embodiment of the present invention.

Another type of memory card that may support ISP and, hence, includes card firmware that may be substantially updated by a user, is a CF card. FIG. 5 is a process flow diagram which illustrates the steps associated with are a process flow diagram which illustrates the steps associated with updating the firmware on a CF card in accordance with an embodiment of the present invention. A process 500 of providing new card firmware to a CF card begins at step 504 in which a host computer determines whether the reader which allows the host computer to interface with the CF card supports ISP. In the described embodiment, such a determination may be made by checking if the SCSI Inquiry data information for ISP support is available on the reader. The determination of whether the CF card supports ISP may include determining if a particular bit in a particular word that contains device information is set appropriately, e.g., whether bit zero of an eighty-third word in IDENTIFY DEVICE information is set to '1.'

It is determined in step 508 if the reader supports ISP. If it is determined that the reader does not support ISP, then the indication is that the reader may not be used to update the firmware on the CF card. Hence, process flow moves to step 512 in which an exception is thrown to indicate that the reader does not support ISP. Once the exception is thrown, the process of updating the firmware on the CF card is effectively terminated.

Alternatively, if it is determined in step 508 that the reader does support ISP, then the host sends a command in step 516 e.g., a SCSI Check ISP command, to firmware on the reader to enable ISP support. One embodiment of a Check ISP command that is suitable for use with respect to a CF card will be described below with respect to FIG. 8a. After the Check ISP command is sent in step 516 ISP support is enabled on the reader in step 520. Enabling ISP support may include in one embodiment, setting bit zero in the eighty-sixth word of IDENTIFY DEVICE information to '1' in response to the Check ISP command.

ISP support on the CF card is enabled in step 524. Typically, the host sends a command to the CF card which causes the CF card to enable itself to receive and to incorporate new firmware. In one embodiment, the command may be a Media Card Check CF ISP may be in the form of an AT Attachment (ATA) command that is embedded in a SCSI Media Card Execute CF command. ATA commands, which are well known in the art, are described in "CompactFlash Memory Card Product Manual," published by SanDisk Corporation of Sunnyvale, Calif., in April 2000, which is incorporated herein by reference in its entirety. One SCSI Media Card Execute CF command in which the Media Card Check CF ISP command is embedded will be described below with respect to FIG. 7a.

Once the ISP support on the CF card is enabled, new card firmware is sent from the host to the CF card in step 528. The new card firmware may be sent from the host to the CF card in a Media Card Execute CF ISP command which is an ATA command that may be embedded within the SCSI Media Card Execute CF command. After the new card firmware is sent to the CF card, the CF card performs a power-on-reset operation in step 532 which disables the ISP support on the CF card. Process flow then proceeds to step 534 in which the host sends a Check ISP command to the reader to disable the ISP support on the reader.

After the ISP support on the reader is disabled, the reader typically electronically detaches itself from the host in step 536. Once the reader is electronically detached from the host, the reader sends a command to the CF card in step 540 to reinitialize the CF card. In one embodiment, in addition to resetting the CF card, the reader may also read new device identifying information from the CF card. From step 540, process flow moves to step 544 in which the reader electronically reattaches itself to the host. By electronically reattaching itself to the host, the reader effectively causes the host or, more specifically, software associated with the host to interact with the CF card as a new device. Upon the reader reattaching itself to the host, the process of updating card firmware on a CF card is completed.

As mentioned above with respect to Figs 4a and 4b, an overall system which supports ISP for SD cards includes recognition of a Check ISP command. That is, an ISP feature set that is associated with SD cards includes a Check ISP command. FIG. 6a is a diagrammatic representation of a command descriptor block for a Check ISP command in accordance with an embodiment of the present invention. A Check ISP command descriptor block 602 generally includes twelve bytes 606a through 606*l* each with eight bits 610a through 610h. Block 602 is associated with a D0h command code, and is essentially a component of a SCSI command that is sent from a host to a reader, e.g., from a host to firmware associated with a reader.

A byte 606a is arranged to include an operation code. A bit 610a of byte 606k is arranged to enable a media card pass through command. That is, bit 610a of byte 606k is arranged to indicate whether a host may send commands or software substantially directly to a card through a reader, instead of having the host send a command to the reader, which then sends the command to the card. In the described embodiment, bit 610a of byte 606k, or a PASS ENB field, may be set to a value of "1" to indicate that media card pass through functionality is enabled.

Typically, media card pass through functionality is enabled when ISP support is enabled, as ISP generally uses pass through commands. When ISP support is enabled, an ISP ENB field, e.g., a bit 610b of byte 606k, may be set to a value of "1." Hence, as ISP uses pass through commands, when the ISP ENB field is set to "1," the PASS ENB field is also set to "1," in the described embodiment. To disable ISP support, the ISP ENB field may be set to a value of "0."

A bit 610h of byte 606k is a "lock bit" which maybe set to a value of "1" to indicate that both ISP mode or support and a media card pass through mode, i.e., a mode which enables a host to send card firmware substantially directly through a reader to a card, may not be altered by altering either the ISP ENB field or the PASS ENB field. In other words, bit 610h of byte 606k effectively serves to prevent mistakes from occurring with respect to enabling ISP mode and a media card pass through mode.

When the ISP ENB field is set to "1," and firmware associated with a reader receives block 602, the reader firmware may set an internal flag for ISP processing. That is, reader firmware may configure itself to enable ISP processing. The reader firmware may also check to determine if the card specific data of the SD card has ISP support functions. After the reader firmware is configured to enable ISP processing, and block 602 is received with the ISP ENB field set to "0," or cleared, the reader firmware generally assumes that the corresponding card firmware has been updated or the host terminates the update process. As a result, the reader may reset the card, detach itself from the USB bus of the host, and reattach itself to the host.

In one embodiment, the reader may return a data block to the host in response to a Check ISP command. FIG. 6b is a diagrammatic representation of a data block that is returned to a host in response to a Check ISP command in accordance with an embodiment of the present invention. A data block 622 includes three bytes 626a through 626c of eight bits 630a through 630h each, and is sent from a reader to a host as a confirmation of a received Check ISP command. It should be appreciated that when a reader that receives a Check ISP command is incapable of supporting ISP, then the reader may return a code to the host which indicates that the Check ISP command was, in effect, invalid. An invalid command is identified by the SCSI Sense Data Format with ILLEGAL REQUEST, value 5, as the Sense Key and INVALID FIELD IN CDB, values 24h and 00h, as ASC and ASCQ.

A first byte 626a of data block 622 includes a bit 630a which is a PASS ENB field that indicates whether the reader is arranged to indicate whether media card pass through capability is enabled after the Check ISP command is executed. A second bit 630b in first byte 626a is an ISP ENB field which is arranged to indicate whether ISP support is enabled. Typically, a value of "1" in the PASS ENB field indicates that media card pass through capability is enabled, while a value of "1" in the ISP ENB field indicates that ISP support is enabled.

Bits 630c-f of byte 626a are arranged to contain a media card type. For example, in one embodiment, if the card is a standard SD memory card, bits 630c-f of byte 626a may be set as '001,' while if the card is a MMC card, bits 630c-f of byte 626a maybe set as '010.' In such an embodiment, bits 630c-f of byte 626a may be set as '011' for a SD input-output (IO) card, bits 630c-f of byte 626a may be set as '100' for a personal computer memory card international association (PCMCIA) card, and bits 630c-f of byte 626a may be set as '101' for a CF card. It should be appreciated that the various codes associated with card types may vary.

Some card types have an associated RCA. When the card is an SD card, for example, bytes 626b and 626c may include RCA bits which are used by the host to substantially ensure that commands are sent to a proper address, i.e., the address associated with the card.

FIG. 6c is a diagrammatic representation of a Media Card Execute SD command descriptor block in accordance with an embodiment of the present invention. A Media Card Execute SD command block 652 that may be arranged within a corresponding SCSI command descriptor (not shown) is arranged to allow a host to send a command to an SD card which passes through a reader, and is associated with a D1h command code. Block 652 is generally arranged as an SD command, with twelve bytes 656a through 656l, each with eight bits 660a through 660h, which is embodied in an overall SCSI command, or a wrapper. A byte 656a is arranged to contain information associated with an operation code which, in the described embodiment, is consistent with a D1h command code. Byte 656b is reserved, as shown in FIG. 6c.

A SD or MMC command that is embedded in block 652 includes bytes 656c-j. When a reader receives block 652, the reader substantially removes at least portions of the embedded command, e.g., removes information associated with bytes 656c-j, and forwards the embedded command to the recipient SC card. The embedded command includes a command index which is stored in byte 656c. The command index substantially holds a command to the SD card, while command arguments which are stored in bytes 656d-g are arguments to the command associated with the command index. Bytes 656h-j hold a data transfer length associated with the amount of data to be transferred from the host.

Byte 656k of block 652 is arranged to contain a response type, e.g., in bits 660e-h, that indicates the SD or MMC response type of the command identified in byte 656c. Bit 660d of byte 656k is arranged to indicate the direction of data transfer. By way of example, when bit 660d of byte 656k is set to a value of '1,' data may be transferred from the reader to the host, while when bit 660d of byte 656k is set to a value of '0,' data may be transferred from the host to the reader. Bit 660c of byte 656k is arranged to indicate a command type such that when bit 660c is set to a value of '1,' the command is considered to be a normal command, whereas when bit 660c is set to a value of '0,' the command is considered to be an application command. Bit 660b of byte 656k, which indicates whether to retrieve response data in response to the command associated byte 656c, may be set to a value of '1' when response data is to be retrieved and to a value of '0' when response data is not to be retrieved. The length of any response data that is to be retrieved is substantially specified by the data transfer length held in bytes 656h-j.

In general, a Media Card Execute SD command starts the execution of the embedded SD command associated with block 652. The reader or, more specifically, firmware associated with the reader may send the embedded command to the SD card, and receive any expected response. By way of example, if the embedded command is a command to retrieve data from the SD card, the reader will generally read data from the SD card and transfer the data to the host. In the event that the reader does not have a buffer arranged to load the data that is read form the host, the reader may read partial data from the SD card and transfer the partial data to the host. Typically, for a reader without a buffer, the reader will continue to read and transfer partial data until substantially all data requested from the SD card is transferred to the host. Similarly, if the embedded command is a command to write data such as new card firmware to the SD card, the reader may read data from the host and transfer the data from the host to the SD card either substantially all at once or in increments, e.g., when the reader does not include a buffer. As will be understood by those skilled in the art, data transfer may generally be accomplished using substantially any suitable protocol. In one embodiment, a data transfer protocol which complies with an X3T10 standard may be used.

A Media Card Execute command which is suitable for use for an SD card is generally different from a Media Card Execute command which is suitable for use with a CF card. With reference to FIG. 7a, one embodiment of a Media Card Execute CF command which is suitable for use in a system which allows updates to be made to firmware associated with a CF card will be described in accordance with the present invention. A command descriptor block 702 for a SCSI Media Card Execute CF command, which is generally embedded inside an overall SCSI command descriptor, includes twelve bytes 706a through 706l, each of eight bits 710a through 710h each. The Media Card Execute CF command is generally consistent with a D2h command code. A byte 706a is arranged to contain information associated with an operation code which, in the described embodiment, is consistent with a D2h command code.

Bytes 706f-k are substantially filled using ATA task file registers. In other words, bytes 706f-k may correspond to ATA commands 1F2 through 1F7 such that task file registers associated with the CF card may be returned as data. Task file registers may include, but are not limited to, an error register, a sector count register, a sector register, a cylinder low register, a cylinder high register, a device/head register, and a command/status register, as will be understood by those skilled in the art. Typically, bytes 706f-k may be extracted by a reader and sent to the CF card. For an embodiment in which data is to be transferred from the CF card to the reader, register values may be retrieved from the CF card and returned to the host through the reader in the format shown in FIG. 7b. As shown, a block 752 as shown in FIG. 7b includes bits bytes 716c-j which correspond to bits bytes 706c-j of block 702, though bits bytes 716c-j will generally have different task file register values. Block 752 also includes byte 716k, which corresponds to a command/status register, as shown in FIG. 7b and as will be understood by those skilled in the art.

A byte 706l is arranged to include a bit 710a which indicates whether the host which initiates the Media Card Execute CF command has an intention to read ATA task file registers back. When bit 710a of byte 706l is set to a value of '1,' the indication may be that the host substantially intends to read ATA task file registers back only. The data format of the returned task file register is shown in FIG. 7b. A second bit 710b of byte 706l is arranged to be set to a value of '1' for a read or input operation, and to be set to a value of '0' for a write or output operation. A third bit 710c of byte 706l is arranged to indicate whether there is data to be transferred In general, except when bit 710a of byte 706l is set to a value of '1,' a reader extracts bytes 706f-k and sends the task file registers to the CF card. If the transfer of data is requested, i.e., when bit 710c of byte 706l indicates that there is data to be transferred, the task file registers specify sector count, sector, cylinder, and head registers using a standard protocol such as a USB mass storage class bulk-only protocol. The direction of the data transfer and the data transfer length are generally both specified in block 702, e.g., in bit 710b of byte 706l, and a USB wrapper which substantially encompasses block 702. In one embodiment, the data transfer protocol used complies with a standard such as an X3T13 standard.

A Check ISP command which is suitable for use with a CF card may be generated by reader firmware, and sent to a CF card. In this described embodiment, such a Check ISP command may also be suitable for use with a SD card. That is, a Check ISP command may be the same for a CF card and for a SD card. Such a Check ISP command may be consistent with a D5h command code for a CF card, and is typically sent from a reader to a flash card once the reader generates the command. FIG. 8a is a diagrammatic representation of a command block associated with a Check ISP command that is suitable for use with a CF card in accordance with an embodiment of the present invention. A command block 804 includes bits 808a through 808h associated with each of registers 812a through 812g. Registers 812, in one embodiment, may be associated with bytes 706f-706k of FIG. 7a. That is, block 804 may effedively be embedded in block 702 of FIG. 7a.

A bit 808a associated with a register 812a is arranged to indicate whether the CF or SD card is to be enabled to support ISP or disabled from supporting ISP. A bit 808a of register 812a may be set to a value of '1,' for example, to indicate that ISP mode is to be enabled and to a value of '0' to indicate that ISP mode is to be disabled. Bits 808 associated with a register 812g are arranged to indicate a Dh5 command code.

Typically, when the reader supports a media card pass through feature set and the appropriate bit in a Check ISP command is set to enable ISP support, e.g., bit 808a of byte 812a of FIG. 8a is set to '1,' then the reader is configured to process substantially any subsequent media card pass through commands. It should be appreciated that if bit 808a of byte 812a of FIG. 8a is set to '0,' the indication is that the host has disabled ISP mode on the CF card. As such, no ISP commands may be sent to the CF card through the reader. Status register outputs associated with a reader which supports ISP commands will be described with respect to FIG. 8b. FIG. 8b is a diagrammatic representation of a data block which may be returned by a CF card to a reader in accordance with an embodiment of the present invention. A block 814 includes registers 822 that each include eight bits 818. In the described embodiment, a 0h is returned in an error register 822a, and in cylinder registers 822d, 822e, while a 55h is returned in a sector count register 822b and an AAh is returned in a sector number register 822c.

A device head register 822f is arranged to indicate a selected device in bit 818e, an is typically set to a value of '0' with only one media card attached to the reader, and whether write protection is active in the CF card in bit 818d. When write protection is active, then bit 818d of register 822f may be set to a value of '1,' whereas if write protection is not active, then bit 818d of register 822f may be set to a value of '0.' Bits 818a-c of register 822f may be set to indicate a media type. For instance, when the card is a CF card, bits 818a-c of register 822f maybe set to a value of '101.' It should be understood that while block 814 has been described as being suitable for being transferred from a CF card to a reader, block 814 may also be configured for use with other media types. When block 814 is used with other media types, the contents of bits 818a-c of register 822f may indicate the appropriate media type.

A status register 822g, which generally returns 50H, includes a bit 818h which is set to a value of '0' once a command, e.g., a Check ISP command, is properly completed. Within status register 822g, a bit 818g may be set to a value of '1,' while a device fault bit 818f, a bit 818d, and an error bit 818a maybe set to a value of '0' when the command is completed.

When there is an error in processing a Check ISP command, an error output block may be sent from a CF card to a reader. Such an error output block may generally indicate that ISP support is not enabled. FIG. 8c is a diagrammatic representation of an error data block that may be sent from a CF card to a reader when an error has been encountered in processing a Check ISP command in accordance with an embodiment of the present invention. An error data block 824 includes registers 832a through 832g which are divided into bits 828a through 828h. When an error occurs in processing a command such as a Check ISP command, a bit in an error register 832a, e.g., a bit 828c, is generally set to indicate that the command has not been processed successfully. In one embodiment, bit 828*c* of error register 832*a* may be set to a value of '1' to indicate that a command has been effectively aborted.

A bit 828*e* that is associated with a device/head register 832*f* is arranged to indicate the selected device, and is typically set to a value of '0' with only one media card attached to the reader. Status register 832*g* is arranged to include a variety of information. By way of example, status register 832*g* includes a bit 828*a* which is generally set to a value of '1' to indicate that an error has occurred, while a bit 828*h* is arranged to be substantially cleared to a value of '0' to indicate that the execution of the command has effectively been completed, and a bit 828*f* which is arranged to indicate when a device fault has occurred is set to a value of '1' in the event that a device fault has occurred. In the described embodiment, a bit 828*g* of register 832*g* may be set to '1' to identify block 824 as an error data block, while a bit 828*d* of register 832*g* may be set to '0' to identify that there is no more data to transfer.

A Media Card Execute CF ISP command, which may be consistent with a D6h command code, is associated with a Media Card Execute CF command, e.g., the command described above with respect to FIG. 7*a*. A Media Card Execute CF ISP command generally starts the execution of the native command embedded inside the corresponding SCSI command. It the embedded command is a command to retrieve firmware data from a CF card, or the underlying card, the corresponding reader may read the data from the CF card and transfer the read data to a host. In the event that the reader does not include a buffer, partial data may be read from the CF card and transferred to the host in a procedure that may be repeated until substantially all read data is transferred. Alternatively, if the embedded command is a command to write firmware data to the CF card, i.e., to update the firmware on the CF card, the reader will generally read the data from the host and transfer the read data from the host to the CF card. When the adapter does not have a buffer, partial data may be read from the host and transferred to the CF card repeatedly until substantially all data are transferred to the CF card.

FIG. 8*d* is a diagrammatic representation of a command block that may be sent between a reader and a CF card as a part of a Media Card Execute CF ISP command in accordance with an embodiment of the present invention. A command block 844 includes registers 852*a* through 852*g* which include eight bits 848*a* through 848*h* each. A command register 852*g* is arranged to indicate that block 844 is consistent with a D6h command code, while a feature register 852*a* includes 848*b-h* which are arranged to return a 0*h* value and a bit 848*a* which is arranged to specify a direction of data transfer. When firmware is to be read from the CF card, bit 848*a* of feature register 852*a* may be set to a value of '1', whereas when firmware is to be written to the CF card, bit 848*a* of feature register 852*a* may be set to a value of '0'.

A sector count register 852*b* is arranged to store a number of sectors that are to be processed, i.e., either to be read from the CF card or to be written to the CF card. A sector number register 852*c* is arranged to store or return the least significant bit of the starting logical block address (LBA) associated with the firmware in the CF card, while cylinder registers 852*d*, 852*e* are arranged to store the middle byte of the LBA and the most significant bit of the LBA, respectively.

Figure 8E:
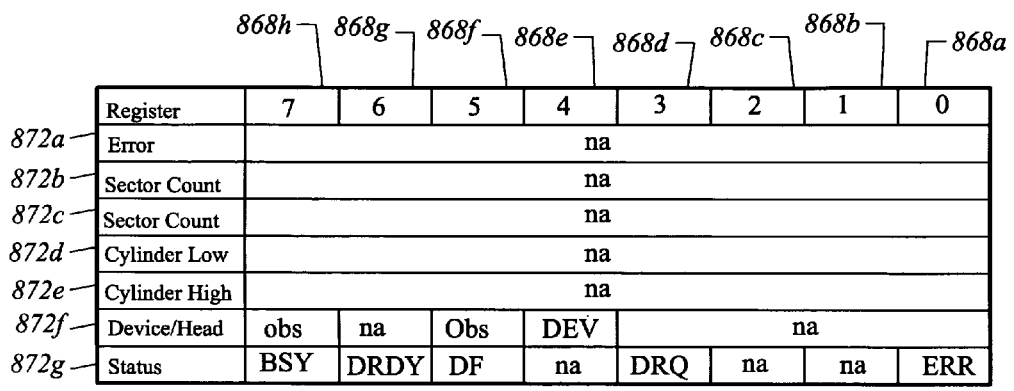
FIG. 8e is a diagrammatic representation of a command block register data that may be sent between a COMPACT FLASH card and a reader which indicates that a Media Card Execute CF ISP command has executed normally in accordance with an embodiment of the present invention.

With reference to FIG. 8*e*, one embodiment of a command block that may be sent between a CF card and a reader which indicates that a Media Card Execute CF ISP command has executed normally will be described. A command block 864, which includes registers 872*a* through 872*g* which are each divided into bits 868*a* through 868*h* may be sent from the CF card to the reader when a command has executed substantially successfully. Registers 872*a-e* may be substantially cleared, while a device/head register 872*f* may include a bit 868*e* which indicates the device, and may be set to a value of '0' with only one media card attached to the reader, which is effectively the target associated with the execution of the command.

A status register 872*g*, which is arranged to return 50H, includes a bit 868*h* which is set to a value of '0' to indicate that the execution of a command has been completed. A bit 868*g* of status register 872*g* may be set to a value of '1,' while bits 868*a*, 868*d*, 868*f* may all be substantially cleared or set to a value of '0' to indicate that a command has executed normally.

Figure 8F:
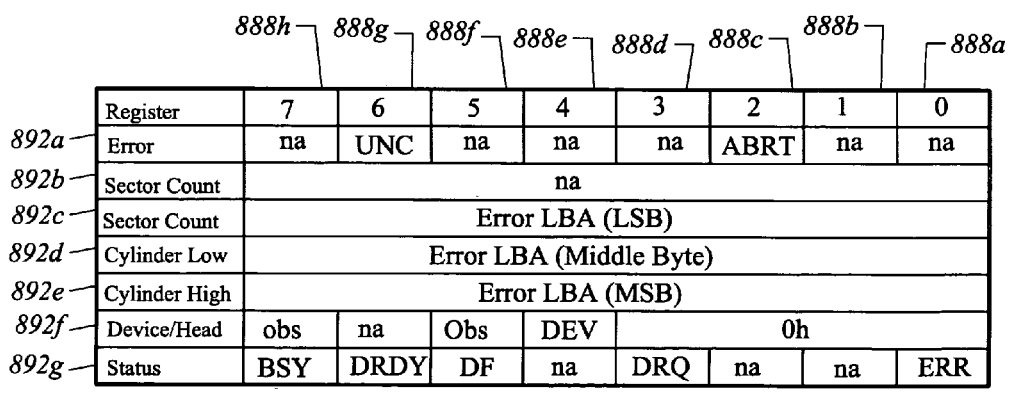
FIG. 8f is a diagrammatic representation of a command block register data that may be sent from a COMPACT FLASH card to a reader to indicate that a Media Card Execute CF ISP command has not executed normally in accordance with an embodiment of the present invention.

When an error occurs in processing a command such as a Media Card Execute CF ISP command, an error data block may be sent from a CF card to a reader to indicate that an error has occurred. Errors may occur during the processing of a command, for example, when a host expects the CF card to have 20 kiloBytes (kBs) of firmware, and the CF card actually has 10 kBs of firmware. FIG. 8*f* is a diagrammatic representation of an error block that may be sent from a CF card to a reader to indicate that a Media Card Execute CF ISP command has not executed normally in accordance with an embodiment of the present invention. An error data block 884 includes bits 888*a* through 888*h* which are associated with each of registers 892*a* through 892*g*. A status register 892*f* includes a bit 888*e* which identifies the device or CF card which the aborted command was targeting.

When there is an error in processing a command, the CF card may set a bit 888*a* of a status register 892*g* to indicate that an error has occurred, and set associated bits 888 in an error register 892*a* accordingly. For example, bit 888*g* of error register 892*a* may be set to a value of '1' if the CF card has an underlying data error. Also, in one embodiment, if the card is removed or changed before completion of a downloading process, bit 888*c* of byte 892*a* may be set to a value of '1' to indicate an aborted process.) That is, bit 888*c* of error register 892*a* may be set to a value of '1' to indicate either that the command was aborted because the command was not supported, that the command was not executed, or that execution of the command was initiated but not completed.

Within a status register 892*g*, a bit 888*h* and bit 888*d* must be set according to the X3T10 protocol. If the error in processing the command has occurred because of a device fault, or, more generally, if a device fault has occurred, then a bit 888*f* of status register 892*g* maybe set to a value of '1.' A bit 888*g* of status register 892*g* maybe set to a value of '1' when the command was completed.

A sector number register 892*c* is arranged to provide the least significant bit of the LBA associated with the sector in the CF card that is causing the error in the execution of the command, if applicable. That is, when a sector causes the execution of a command to be aborted, the least significant bit of the LBA of that sector is returned to the reader in sector number register 892*c*. When a sector is the cause of an aborted command, a cylinder low register 892*d* and a cylinder high register 892*e* are arranged to return the middle byte of the LBA of the sector and the most significant bit of the LBA of the sector, respectively.

Although only a few embodiments of the present invention have been described, it should be understood that the present invention may be embodied in many other specific forms without departing from the spirit or the scope of the present invention. By way of example, while a reader has generally been described as being a USB reader, the reader may be substantially any suitable reader or adapter which allows a memory card to communicate with a host system. Suitable readers include, but are not limited to, PC card readers.

The downloading of firmware has generally been described as involving sending new card firmware or code from a host computer substantially directly to the memory or media card through a reader. When firmware is sent to the card substantially directly from the host computer, any changes which are to be made to enhance the capabilities of the overall system may be performed by substantially only upgrading the software on the computer. In other words, it may not be necessary to upgrade reader firmware to enhance ISP capabilities. ISP capabilities may be enhanced essentially be upgrading software associated with the host computer system. It should be appreciated, however, that in some embodiments, new card firmware may be sent from a host computer to a reader, and the reader may send ISP commands to a memory card.

When new card firmware is provided to a memory card to update or upgrade the memory card, the new card firmware may generally include sections of firmware which are intended to replace corresponding sections of firmware that are currently in the memory card. New card firmware may also include sections of firmware which are to be added to the firmware that is currently on the memory card, e.g., to augment the current firmware. In one embodiment, the new card firmware that is provided to the memory card may be intended to replace substantially all of the firmware that is currently on the memory card.

The bits and the words associated with various functions and command descriptors may vary widely. In other words, specific bits or words which are set a certain way in command descriptor blocks to indicate different states associated with the blocks may vary. For instance, the bits that are set to indicate that ISP is supported and the bits that are set to enable ISP support may generally vary. In lieu of setting bit nineteen in card specific data information to '1' to indicate that ISP is supported in a system associated with an SD card, for example, substantially any other bit may be set. Any bit may be set as long as the overall system is aware of which bit is to be set to indicate that ISP is supported.

While commands and data blocks have generally been described as either being suitable for use with SD cards or with CF cards, it should be appreciated that the commands may generally be applicable to other types of memory cards. By way of example, commands that are suitable for SD cards may also be suitable for multi media cards. In addition, commands and data blocks that have been described as being suitable for use with respect to CF cards may be augmented to be used with other types of cards including, but not limited to, SD cards. Alternatively, such commands and data blocks may be suitable for use with some types of memory cards substantially without augmentation.

Further, memory cards which have firmware that may be updated using ISP commands may be widely varied. Other types of memory cards which have firmware that may be updated using the methods described above include, but are not limited to, MEMORY STICK cards and SMART MEDIA cards.

Further, memory cards which have firmware that may be updated using ISP commands may be widely varied. Other types of memory cards which have firmware that may be updated using the methods described above include, but are not limited to, Memory Stick cards and Smart Media cards.

The host has been described as being in communication with a reader that is in communication with a memory card. Although the host and the reader may be substantially separate entities, i.e., the reader may be a peripheral device which may be readily attached to and detached from the host, it should be understood that the reader may also be a part of the host. For instance, the reader may be an integral part of the host that may not be easily attached to or detached from the host.

Firmware that may be updated may include, in one embodiment, firmware code which enables ISP to be supported. That is, ISP code itself may be updated in a memory card using an ISP process that is arranged to update or upgrade the card firmware. In particular, if the card firmware is in electrically erasable programmable read-only memory (EEPROM) and the execution of the firmware is in static random access memory (SRAM), then the ISP code associated with the card firmware may be updated during a card firmware updating process.

In general, the steps associated with the various processes of the present invention may be widely varied. Steps may be reordered, altered, added, and removed without departing from the spirit or the scope of the present invention. By way of example, processes associated with updating card firmware on SD cards and CF cards may include steps associated with determining if the SD cards and CF cards, respectively, support ISP. Therefore, the present examples are to be considered as illustrative and not restrictive, and the invention is not to be limited to the details given herein, but may be modified within the scope of the appended claims.

What is claimed is:

1. A method for updating firmware associated with a memory storage device, the method comprising:
    providing new firmware to a host;
    sending the new firmware from the host to a reader, the host being in communication with the reader, the reader being arranged to interface with the memory storage device, wherein the memory storage device includes installed firmware;
    enabling in-system programming capabilities on the reader, wherein the in-system programming capabilities allow the new firmware to be incorporated into the memory storage device;
    sending the new firmware from the reader to the memory storage device;
    incorporating the new firmware into the memory storage device by writing the new firmware into the memory storage device using the host, wherein the new firmware at least partially replaces and updates the installed firmware;
    resetting the memory storage device after incorporating the new firmware into the memory storage device;
    disabling the in-system-programming capabilities on the reader;
    communicably detaching the reader from the host;
    reinitializing the memory storage device; and
    communicably reattaching the reader to the host.

2. The method of claim 1 wherein the memory storage device is a memory card that includes a non-volatile memory.

3. The method of claim 2 wherein the memory card is one selected from the group consisting of a secure digital card, a COMPACT FLASH card, a MULTIMEDIA card, a SMART MEDIA card, and a MEMORY STICK card.

* * * * *